(12) United States Patent
Cudmore et al.

(10) Patent No.: US 9,465,951 B1
(45) Date of Patent: Oct. 11, 2016

(54) SYSTEMS AND METHODS FOR RESOURCE MANAGEMENT AND CERTIFICATION

(71) Applicant: JPMorgan Chase Bank, N.A., New York, NY (US)

(72) Inventors: Thomas Cudmore, Wylie, TX (US); Dimitry Berestovetsky, Columbus, OH (US); Joseph A. Greene, Delaware, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 14/508,781

(22) Filed: Oct. 7, 2014

Related U.S. Application Data

(60) Provisional application No. 61/888,258, filed on Oct. 8, 2013, provisional application No. 61/912,879, filed on Dec. 6, 2013.

(51) Int. Cl.
*H04L 29/06* (2006.01)
*G06F 21/62* (2013.01)

(52) U.S. Cl.
CPC ... *G06F 21/6218* (2013.01); *G06F 2221/2145* (2013.01)

(58) Field of Classification Search
CPC .................................................. G06F 21/6218
USPC .......................................................... 726/1
See application file for complete search history.

(56) References Cited

U.S. PATENT DOCUMENTS

| | | | | |
|---|---|---|---|---|
| 8,561,152 B2* | 10/2013 | Novak | ............... | G06F 21/6218 705/51 |
| 2003/0225612 A1* | 12/2003 | DeSimone | ............ | G06Q 40/08 705/13 |
| 2008/0195625 A1* | 8/2008 | Hargroder | ............. | G06Q 40/08 |
| 2009/0300098 A1* | 12/2009 | Millmore | ............... | G06Q 10/06 709/203 |
| 2010/0250308 A1* | 9/2010 | Mayer | .................... | G06Q 30/02 705/311 |
| 2010/0250538 A1* | 9/2010 | Richards | ............... | G06Q 10/06 707/737 |
| 2010/0250735 A1* | 9/2010 | Andersen | ............... | G06Q 10/10 709/224 |
| 2012/0297455 A1* | 11/2012 | Novak | ............... | G06F 21/6218 726/4 |
| 2015/0101017 A1* | 4/2015 | Abuelsaad | ......... | H04L 41/5061 726/3 |

* cited by examiner

*Primary Examiner* — Michael S McNally
(74) *Attorney, Agent, or Firm* — Hunton & Williams LLP

(57) ABSTRACT

Systems for managing access to a plurality of resources for an organization are disclosed, and may include a plurality of resources associated with an organization and having an access restriction; an interface for onboarding each resource to a resource inventory; a human resources data feed that identifies a status for a plurality of individuals within the organization; a termination and transfer service that changes an individual's access to a resource based on a change in the individual's status; an ownership service that assigns at least one of the individuals to be a default owner for each resource; an evergreen service that modifies the default owner for a resource based on a change in the owner's status; a policy service that monitors ownership for compliance with at least one policy; a certification service that certifies each individual's access to the plurality of resources; and a reporting service.

16 Claims, 3 Drawing Sheets

SYSTEMS AND METHODS FOR RESOURCE MANAGEMENT AND CERTIFICATION

RELATED APPLICATIONS

The present application claims priority to U.S. Provisional Patent Application Ser. No. 61/888,258, filed Oct. 8, 2013, the disclosure of which is incorporated, by reference, in its entirety.

BACKGROUND OF THE INVENTION

1. Field of the Invention

The present invention generally relates to the certification, and, more particularly, to systems and methods for resource management and certification.

2. Description of the Related Art

Organizations seek to control the access that employees have to organizational resources, such as computer programs and facilities. If an employee has access to a resource that the employee should not have access to, the organization may be put at risk.

SUMMARY OF THE INVENTION

Systems and methods for resource management and certification are disclosed.

Systems for managing access to a plurality of resources for an organization are disclosed. In one embodiment, the system may include a plurality of resources associated with an organization, each resource having an access restriction; an interface for onboarding each resource to a resource inventory; a human resources data feed, wherein the human resources data feed identifies a status for a plurality of individuals within the organization; a termination and transfer service that changes an individual's access to a resource based on a change in the individual's status within the organization; an ownership service that assigns at least one of the individuals to be a default owner for each resource; an evergreen service that modifies the default owner for a resource based on a change in the owner's status within the organization; a policy service that monitors ownership for compliance with at least one policy; a certification service that certifies each individual's access to the plurality of resources; and a reporting service that provides reporting service regarding the plurality of resources.

In one embodiment, the resource may be a computer-based resource.

In one embodiment, the resource may be a physical resource.

In one embodiment, the resource may be access to an area.

In one embodiment, the termination and transfer service may terminate an individual's resource access in response to the individual being terminated.

In one embodiment, the ownership service may assign the default owner to a resource based on referential data for the resource.

In one embodiment, the at least one policy is an organizational policy.

In one embodiment, the at least one policy is a government regulation.

Method for managing access to a plurality of resources in an organization are disclosed. In one embodiment, the method may include (1) at least one computer processor adding a resource to a resource database for the organization; (2) the at least one computer processor granting an individual access to the resource; (3) the at least one computer processor monitoring an employment status of the individual; and (4) the at least one computer processor automatically altering the individual's access in response to a change in employment status.

In one embodiment, the method may further include the at least one computer processor verifying that the individual's access complies with at least one of an organizational policy, an applicable law, or an applicable regulation.

In one embodiment, the employment status may be employed, transferred, or terminated.

In one embodiment, the method may further include the at least one computer processor associating an owner with the resource.

In one embodiment, the method may further include the at least one computer processor monitoring an employment status of the owner for changes and the at least one computer processor assigning a new owner in response to a change in employment status of the owner.

In one embodiment, the method may further include the at least one computer processor verifying that the ownership assignment complies with an organizational policy, an applicable law, and/or an applicable regulation.

In one embodiment, the method may further include the at least one computer processor generating a report based on the organization's compliance with an organizational policy, an applicable law, and/or an applicable regulation.

In one embodiment, the method granting an individual access to the resource may include (i) the at least one computer processor monitoring an employment status of the individual; and (ii) the at least one computer processor automatically altering the individual's access in response to a change in employment status.

In another embodiment, a method for managing access to a plurality of organizational resources in an organization may include (1) at least one computer processor monitoring an organization for an organizational change comprising at least one of an employment status of a plurality of individuals in an organization and at least one of an organizational policy and an applicable law or regulation; and (2) the at least one computer processor automatically altering one of the plurality of individual access to at least one organizational resource in response to the organizational change.

In one embodiment, the individual's employment status may be transferred or terminated, and the individual's access to the at least one organizational resource is terminated.

In one embodiment, the organizational change is a restriction on access to a resource, and the individual's access to the at least one organizational resource is terminated.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF PREFERRED EMBODIMENTS

Figure 1:
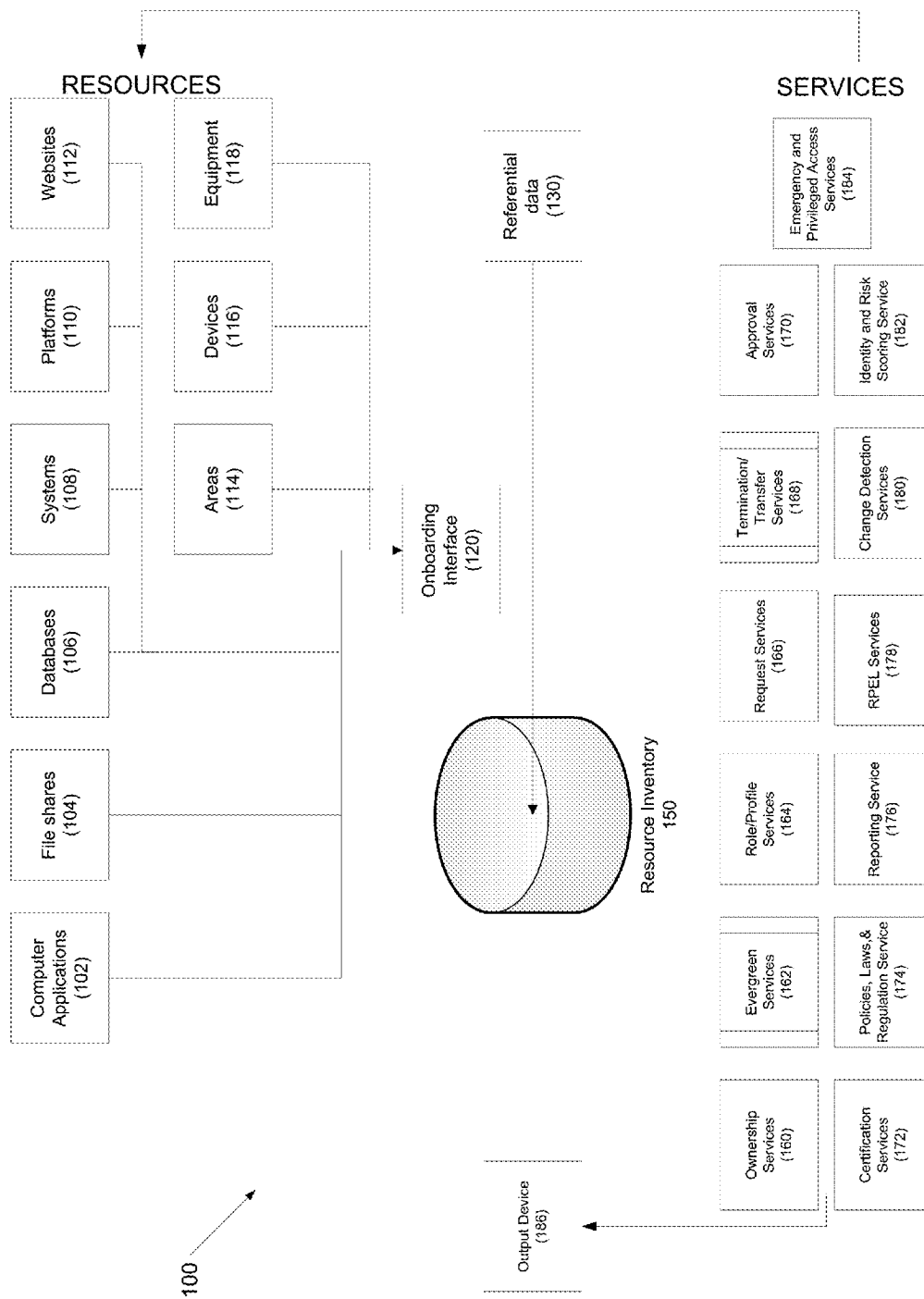
FIG. 1 depicts a block diagram of a system for resource management and certification according to one embodiment.

Embodiments relate to the use of a process that may manage access to certain enterprise resources by an individual or group of individuals, and may further facilitate the process by which this access may be certified. For example, access to an enterprise's computer resources, including computer software and applications, network locations, websites, databases, shared drive locations, computer systems, computer platforms, etc. may be managed. In addition, access to other resources, such as access to certain areas (e.g., buildings, secure areas, offices, laboratories, etc.), physical resources (e.g., access cards, computers, mobile phones, vehicles, etc.) may be managed as necessary and/or desired.

It should be recognized that the disclosure has applicability to a wide range of industries and fields in which the management of access to resources is important. Examples include the banking and financial industry, the medical industry, property management, real estate, government, security, information technology, research and development, etc.

In addition, in one embodiment, embodiments relate to the certification of access to resources (e.g., computer resources, physical resources, access, etc.). For example, human resources data and defined individual roles and profiles may be used to monitor individual activities and individual access to resources for compliance with policies, and may update individual access to resources, the resources themselves, etc. based on changes in the environment. Examples of such changes include changes in regulations, company policies, world events, job statuses, job responsibilities, software applications, other resource changes, etc.

As used herein, the terms "individual(s)" and "user(s)" may encompass employees, agents, contractors, or anyone affiliated with an organization that may have access to certain organizational resources managed and/or certified.

In one embodiment, a role and profile based access control model may be used. A profile may be associated with an individual access to a single resource. A "role" may be a combination of more than one profile, and therefore grants access to multiple resources.

In one embodiment, the roles and profiles may be standardized across an organization (or parts of an organization) to assist in the certification process. This may account for "sterile" position definitions (i.e., positions and/or relationships that have responsibilities and required resources that do not change significantly day-to-day) and "non-sterile" position definitions (i.e., positions and/or relationships that have responsibilities and required resources that may vary significantly day-to-day). In one embodiment, sterile position definitions may be automated, while non-sterile position definitions may require additional input and review.

In one embodiment, input from human resources or other individual management systems may be used in the management and/or certification processes. For example, on-boarding (e.g., hiring), off-boarding (e.g., termination), transfer, reassignment, etc. data may be used in managing and/or certifying access to resources. Thus, resources may be automatically managed in a timely manner.

In addition, organizational policies (e.g., if an individual has access to resource A, the individual cannot have access to resource B), interpretations of laws and regulations, etc. For example, organizational policies may be implemented in order to identify toxicity, such as any access that could enable an individual (intentionally or unintentionally) to commit fraud, to take an action that is against an organizational policy or that is illegal, etc. With proper monitoring and alerting, the potential for such toxic accesses may be mitigated either manually or systemically. At the very least, these controls may increase risk awareness within the organization.

Referring to FIG. 1, a system for resource management is disclosed according to one embodiment. System 100 may include computer related resources, such as computer applications 102, file shares 104, databases 106, systems 108, platforms 110, and websites 112. Any other computer-related resources that an organization may seek to control access to may be included as necessary and/or desired.

In addition, system 100 may include physical resources, such as area access 114, devices 116, equipment 118, etc. Any other physical resources that an organization may seek to control access to may be included as necessary and/or desired.

In one embodiment, computer-related resources may be added to global resource inventory 150 via onboarding interface 120, an application programmable interface (not shown), manually, or by any method as is necessary and/or desired.

In one embodiment, a baseline of centralized attributes for resources may be maintained. In one embodiment, resources may submit metadata daily, periodically, upon changes, etc.

Global resource inventory 150 may store some or all of the computer-related and/or physical resources for an organization. In one embodiment, global resource inventory 150 may reside in a database, a registry, etc. In one embodiment, the global resource inventory 150 may stay on the system of record with an API service call to provided data as pre-arranged or contracted.

Referential data 130 may provide information regarding the different resources, individuals, organization, etc. For example, it may identify the particular resource, the different types of access that the resource may have, the owner and/or responsible party for the resource, etc. Referential data 130 may further include human resources data, such as new hires, transfers, reassignments, terminations, etc. Other information, including organizational, geographical, financial, user, etc. may be provided as necessary and/or desired. In one embodiment, the information may be relevant to individuals, resources, products, etc.

In one embodiment, resource inventory 150 may associate each resource (e.g., resources 102-118) with the data from the referential resource data 130.

System 100 may further include several services. For example, ownership service 160 may identify the owner and/or responsible party for each resource or a portion of the resource.

In one embodiment, ownership service 160 may need to consider additional data to verify, confirm or identify the owner of a resource. For example, in one embodiment, security/event scanning may be used along with other data elements (email id, security log, phone number, data feed from HR, IP and/or physical address) to identify owners. As another example, data may be correlated to identify the highest probability owner of an application for certification based on behavior of individuals. A link between probable owners and an application may be created, and the owners may certify that are the owner and then perform certifications.

In still another embodiment, a HR link/data, etc. may be used to detect changes to ownership based on transfers and terminations.

In one embodiment, ownership service 160 may use referential data 130 for owners to establish a default primary owner, who may assign owners of tasks that are associated with the resource. Example resource tasks owner types include Approver, Security Liaison, Certifier, Information Owner, Attester, etc. In one embodiment, each accountable owner may be assigned a backup owner.

In one embodiment, ownership service 160 may support assigning "Do Not Disturb" and "Delegation" to certain owners.

Ownership service 160 may use an assignee acceptance and approval process.

In one embodiment, once ownerships are established, they may be kept updated by way of evergreen service 162.

In one embodiment, ownership service 160 may offer multiple global and local ownership (criteria scope) and multi-level capability.

Evergreen services 162 may provide resource information, ownership information, human resource information, etc. for consumption. In another embodiment, it may provide data that may be used for controls, for referential sources, such as certification service 172, for consumption. In one embodiment, evergreen services 162 may update any or all of this information continuously, periodically, or as desired. For example, if an individual was identified as an owner of a resource, but has been transferred or terminated, evergreen services 162 may identity the individual's successor and update the ownership information.

In one embodiment, evergreen services 162 may take the results of termination and transfer service 168 and apply it to ownership participants. For example, for a transfer, evergreen services 162 may save old and new employment data until action to reconcile the two is completed. As a default, evergreen services 162 may assign the ownership of the resources to the transferee's manager as a default. For a termination, evergreen services 162 may assign the ownership of the resources to the terminated employee's manager as a default. Other default actions may be applied as is necessary and/or desired.

In one embodiment, evergreen services may "learn" ownership and/or responsibility for a resource based on the individual or individuals that access the application, perform administrative features, environmental conditions, pattern matching, etc. For example, ownership, an individual's ability to conduct a transaction, an individual's access to a resource, etc. based on, environmental pattern recognition, historical events and similar behavior experienced during similar event or prior point in time.

Role/profile services 164 may maintain the access to certain resources to roles and/or profiles. As used herein, a profile is an individual's access to a single resource or part of a resource, while a role is a collection of profiles.

In one embodiment, role/profile services 164 may be a centralized location that has the ability to create, define and maintain roles and profiles. The roles and/or profiles may be only for a certain portion of the organization, or they may be used throughout the organization.

In one embodiment, the roles and profiles may be manually built for individuals. In another embodiment, the roles and profiles may be automatically built based on anticipated resource access, historical resource access, etc.

In one embodiment, a set of roles/profiles may be standardized across an organization, including parts of the organization (e.g., departments, etc.). In one embodiment, role/profile services 164 may provide service calls to, for example, Request Services 166 and Certification Service 172 in order to streamline and gain efficiencies based on the use of group management replacing individual user management.

Request services 166 may be provided to request that individuals be added to the system (e.g., on-boarded), removed from the system (e.g., off-boarded), transferred, have their resource access modified, added, or deleted, etc.

In one embodiment, request services 166 may store routes for manual and automated provision and off boarding services. It may provide a front-end graphical user interface, provide updates for user requests, support roles and profiles, and support access policies.

Termination/transfer services 168 may track individuals that have been terminated from the organization and/or transferred within the organization. In one embodiment, termination/transfer services 168 may terminate an individual's resource access upon the individual being identified as terminated.

In one embodiment, termination/transfer services 168 may identify changes in human resources data for changes in employment, financial, and/or company status. For example, changes in employment status may include a change to terminated status, retired status, deceased status, etc. These status changes indicate that the individual should be "offboarded" from the system. In one embodiment, the individual may be offboarded instantaneously; e.g., the individual's access rights may be terminated.

In one embodiment, no change in status, but two additional changes may result in a transfer. For example, an accounting change with no other changes may indicate a financial change, while an accounting change and a manager change may indicate that a transfer has occurred.

Approval services 170 may be provided. Approval services 170 may approve or deny requests. In one embodiment, approval services 170 may provide approval mappings, support simple and complex approval work flow models, keep approvers' roles up to date, etc.

In addition, certification service 172 may be provided. A certifier may be presented with standard roles and profiles when certifying the access that an individual, or a group of individuals, have access to. The certifier may assign an individual to one of those roles/profiles. Any rules, policies, exceptions, etc. may be provided as well.

In one embodiment, certification service 172 may provide timed event systemic certification services.

In one embodiment, certification service 172 may provide an exception certification process.

Certification service 172 may supports delegation at various levels, such as at the individual level, at the country level, at the organizational level, etc. It may also support forced access removal capability and may auto-delete individuals as configured.

A certifier may be provided with options to grant or remove access, add comment, or request additional information.

To assist in certification, a "trusted certifier" program may be established. For example, a score may be kept based on a certifier's past performance. A trusted certifier may be provided with specific advantages, such as a reduction in the frequency of recertification.

In one embodiment, the certification may occur continuously. For example, each time an individual seeks to exercise access to a resource or resources, a check may be made to ensure that the certification is current.

In one embodiment, the trusted certifier may be based on, for example, a historical certification track record. The certifier may be given a score that provides them specific advantages such as less frequent certification. The certifier may be provided with options to approve, remove access—such as need more information or add a comment. In one embodiment, the certifier may be given a rating option to certifier to rate, for example, yes/no, thumbs up/thumbs down, etc. for the certification description.

In one embodiment, certification service 172 may provide details regarding what is required to get access to an application if certification is denied.

In one embodiment, policy, law, and regulation services 174 may be provided. In one embodiment, organizational policies (e.g., if an individual has access to resource A, the individual cannot have access to resource B), interpretations of laws and regulations, etc. For example, organizational polices may be implemented in order to identify toxicity, such as any access that could enable an individual (intentionally or unintentionally) to commit fraud, to take an action that is against an organizational policy or that is illegal, etc. With proper monitoring and alerting, the potential for such toxic accesses may be mitigated either manually or systemically. At the very least, these controls may increase risk awareness within the organization.

In one embodiment, policy, law, and regulation services 174 may ensure that access and ownership is compliant through continuous monitoring and alerting. Policy, law, and regulation services 174 may support various local and country regulations, and may control and monitor "toxic combinations" and other forms of toxicity.

Reporting service 176 may provide on-demand and off-line reporting. For example, reporting service 176 may provide reports on compliance, contacts, inventory, event logs, access management services, exceptions, individual access to resources, certification, ownership of resources, terminations and transfers, "do not disturb" individuals, request fulfillment, etc. Any other reports may be provided by reporting service 176 as is necessary and/or desired.

In one embodiment, reporting service 176 may interact with any service necessary for the desired report as is necessary and/or desired.

Request and Provisioning Event Logging (RPEL) Service 178 may allow individuals with audit and operations job functions to view log file data throughout the request's lifecycle. In one embodiment, it may provide a provisioning audit trail, a restorable event history, etc.

Change detection services 180 may identify accesses that an individual may have that has not been approved by, for example, Policies, Laws, & Regulation Service 174.

Identity and Risk Scoring Service 182 may identify individuals that may be risky based on level of access and adaptive attributes.

Emergency and privileged access services 184 may be provided. In one embodiment, emergency and privileged access services 184 may provide a vault that may provide temporary access identifiers for system maintenance. In one embodiment, the access provided by emergency and privileged access services 184 may be closely tracked and/or monitored.

System 100 may further include output device 186. In one embodiment, output device 186 may memorialize an individual's access. For example, output device 186 may program an access card so that the individual may access an area, building, etc. As another example, output device 186 may program a resource, such as a laptop, desktop, tablet computer, smart phone, etc. for the individual. As another example, output device 186 may output the results of an inquiry, request, or certification. Output device 186 may provide other functionality as is necessary and/or desired. In one embodiment, output device 186 may interact with services, resources, etc. as is necessary and/or desired.

Figure 2:
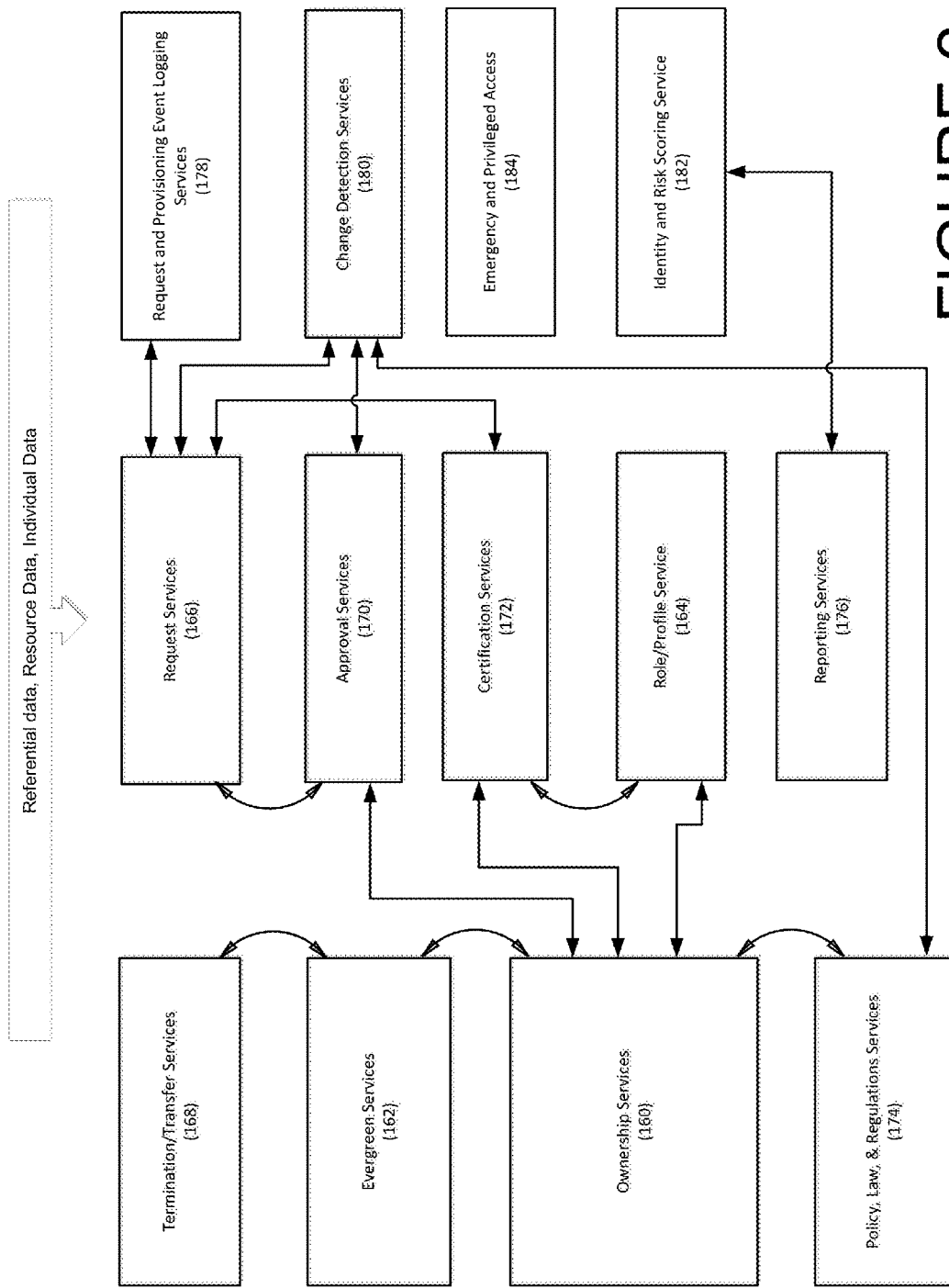
FIG. 2 depicts example interactions between services in a system for resource management and certification according to one embodiment.

Referring to FIG. 2, a process flow depicting the interaction between services is provided. As noted above, system 100 may be used to monitor and react to the addition, transfer, and termination of individuals; the addition, modification, and removal of resources; the addition, modification, and deletion of policies, etc. Example use cases are described below.

In response to a human resources change, such as the addition of an individual, a human resources feed may inform system 100 of a change. In response, termination/transfer service 168 may change (e.g., add, modify, delete) the individual's access to resources. Evergreen services 162 may determine which resources need to be updated to reflect the change. Ownership service 160 may update the owner of a resource. Approval services 170 may seek approval for any changes, such as changes in ownership. Change detection services 180 may identify accesses that an individual may have that has not been approve by, for example, policies, laws, and regulation service 174, and policy, law and regulation services 174 may verify that any requested changes are in compliance with the organization's policies, as well as applicable laws and regulations.

Role and profile services 164 may create, modify, or delete any roles for the individual. Certification services 172 may certify the change. Reporting services 176 may provide reports on the change as is necessary and/or desired. Request and provisioning event logging services 178 may log the change. Identity and risk scoring service 182 may evaluate and score any risk that may be associated with the change.

If emergency access is required for a person that normally would not have access to the data is required, emergency and privileged access services 184 may be used to update the data.

In response to a change in resource (e.g., onboard, modify, off board), ownership services 160 may assign, reassign, or delete an owner to the resource. Approval services may seek any required approval. Evergreen services 162 may monitor the ownership. Change detection services 180 may identify accesses that an individual may have that has not been approved by, for example, policies, laws, and regulation service 174, and policy, law and regulation services 174 may ensure that any ownership, access, etc. to the resource is in compliance with the organization's policies, as well as applicable laws and regulations. Role and profile services 164 may add, modify or delete a role and/or profile associated with the resource.

Certification services 172 may certify the change. Reporting services 176 may provide reports on the change as is necessary and/or desired. Request and provisioning event logging services 178 may log the change. Identity and risk scoring service 182 may evaluate and score any risk that may be associated with the change.

Evergreen services 162 may monitor ownership to ensure that ownership is current and accurate.

In response to a change in policy, laws or regulations, policy, law and regulation services 174 may identify any access that may not be in compliance with the organization's policies, as well as applicable laws and regulations. That may cause changes in ownership (via ownership services 160) that may require approval (approval services 170), changes to roles and profiles (e.g., role and profile services 164), certification (certification services 172), etc. Other services may perform similar functions as described above.

The foregoing use cases are exemplary only. Additional or fewer services may be involved as is necessary and/or desired. In addition, additional organizational events may be processed as is necessary and/or desired.

In one embodiment, once the data feeds are established, the system may operate with minimal interaction. In addition, because it may continuously monitor changes in personnel, resources and/or policies, laws and regulations, the system may provide real-time and continuous updating of access and/or certification.

Figure 3:
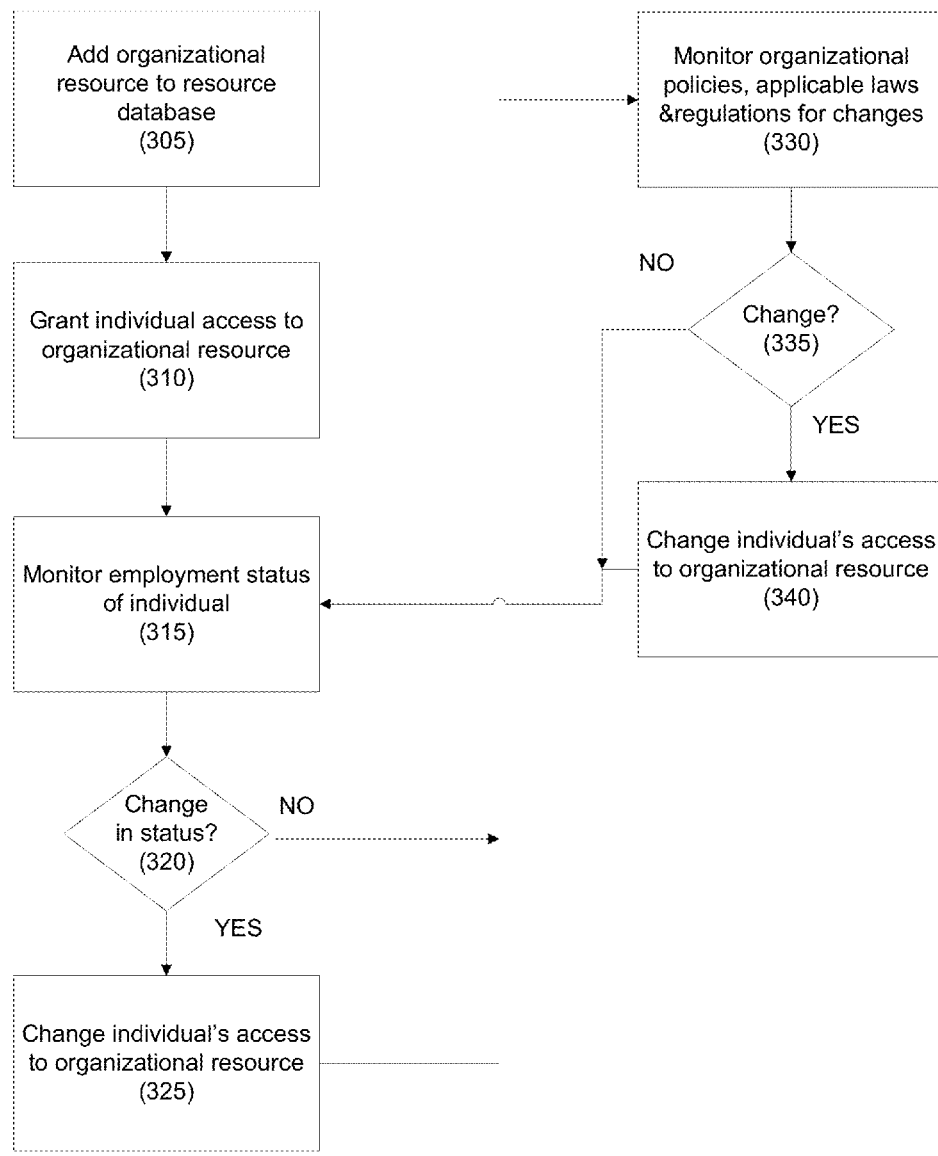
FIG. 3 is a flowchart depicting a method for resource management and certification according to one embodiment.

Referring to FIG. 3, a flowchart depicting a method for managing access to a plurality of resources in an organization according to one embodiment is disclosed.

In step 305, an organizational resource may be added to an organizational resource database. In one embodiment, the resource may be added using, for example, an onboarding database. Referential data regarding the resource may be collected and may be associated with the resource.

In step 310, an individual may be granted access to the resource. In one embodiment, the individual may be granted access based on the individual role and/or profile.

In step 315, the employment status of the individual may be monitored. In one embodiment, a human resources data feed may be monitored. The data feed may be, for example, a streaming, real-time feed; it may be a periodic update; etc. Any suitable mechanism for receiving data regarding the individual's employment status may be used as necessary and/or desired.

In one embodiment, the individual's employment status may be employed, transferred, or terminated. Other statuses may be used as necessary and/or desired.

In step 320, if there is a change in employment status, the individual's access may change. For example, if the individual is terminated, the individual's access may be terminated. If the individual is transferred, the individual's access may be terminated or modified. In one embodiment, access to a different resource may be granted if required as a result of the termination.

In one embodiment, resource status may also be monitored and access modified as a result of a change in the resource (e.g., decommissioned, deleted, etc.).

In step 330, organization policies and/or applicable laws and regulations may be monitored for changes that may require changes in the individual's access. For example, an organization may prohibit an individual from having access to resource A and resource B. As another example, a law or regulation may prohibit transactions with country X.

In step 335, if there is a change that requires the individual's access to the resource to be changed, in step 340, the individual's access may change.

In one embodiment, the monitoring may be continuous in that the employment status, policies, laws and regulations, resource status, etc. may be monitored continuously in real time, periodically, or as necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for managing access to a plurality of computer-based resources for an organization, comprising:
   a plurality of computer-based resources associated with an organization, each computer-based resource having an access restriction;
   an interface that electronically interfaces with each of the plurality of computer-based resources and automatically onboards each computer-based resource to a computer-based resource inventory;
   a streaming human resources data feed, wherein the human resources data feed identifies a status for a plurality of individuals within the organization;
   a first computer processor executing a termination and transfer service that automatically changes an individual's access to a computer-based resource based on a change in the individual's status within the organization;
   a second computer processor executing an ownership service that automatically assigns at least one of the individuals to be a default owner for each computer-based resource;
   a third computer processor executing an evergreen service that automatically modifies the default owner for a computer-based resource based on a change in the owner's status within the organization;
   a fourth computer processor executing a policy service that automatically monitors ownership for compliance with at least one policy for accessing at least one of the computer-based resources;
   a fifth computer processor executing a certification service that automatically certifies each individual's access to the plurality of computer-based resources; and
   a sixth computer processor executing a reporting service that provides reporting regarding the plurality of computer-based resources.

2. The system of claim 1, wherein the termination and transfer service further automatically changes an individual's access to a physical resource based on a change in the individual's status within the organization.

3. The system of claim 1, wherein the termination and transfer service further automatically changes an individual's access to an area based on a change in the individual's status within the organization.

4. The system of claim 1, wherein the termination and transfer service terminates an individual's access to at least one computer-based resource in response to the individual being terminated.

5. The system of claim 1, wherein the ownership service assigns the default owner to a computer-based resource based on referential data for the resource.

6. The system of claim 1, wherein the at least one policy is an organizational policy.

7. The system of claim 1, wherein the at least one policy is a government regulation.

8. The system of claim 1, wherein at least one of the first computer processor, the second computer processor, the third computer processor, the fourth computer processor, the fifth computer processor, and the sixth computer processor are the same computer processor.

9. A method for managing access to a plurality of computer-based resources in an organization, comprising:
   at least one computer processor adding a computer-based resource to a computer-based resource database for the organization;
   the at least one computer processor associating an owner with the computer-based resource;
   the at least one computer processor granting an individual access to the computer-based resource;
   the at least one computer processor receiving a streaming human resources data feed that identifies a status for a plurality of individuals within the organization; and
   the at least one computer processor automatically altering the individual's access to the computer-based resource in response to a change in employment status.

10. The method of claim 9, further comprising:
    the at least one computer processor verifying that the individual's access to the computer-based resource complies with at least one of an organizational policy, an applicable law, or an applicable regulation.

11. The method of claim 9, wherein the employment status is one of employed, transferred, and terminated.

12. The method of claim 9, further comprising:
    the at least one computer processor monitoring an employment status of the owner for changes; and
    the at least one computer processor assigning a new owner to the computer-based resource in response to a change in employment status of the owner.

13. The method of claim 12, further comprising:
    the at least one computer processor verifying that the ownership assignment for the computer-based resource complies with at least one of an organizational policy, an applicable law, or an applicable regulation.

14. The method of claim 9, further comprising:
    the at least one computer processor generating a report based on the organization's compliance with at least one of an organizational policy, an applicable law, or an applicable regulation for accessing the computer-based resource.

15. The method of claim 14, wherein the step of granting an individual access to the computer-based resource comprises:
    the at least one computer processor automatically altering the individual's access to the computer-based resource in response to a change in employment status.

16. A method for managing access to a plurality of organizational computer-based resources in an organization, comprising:
    at least one computer processor receiving at least one streaming data feed that identifies a status for a plurality of individuals within the organization and an organizational change comprising and at least one of an organizational policy and an applicable law or regulation;
    the at least one computer processor automatically altering one of the plurality of individual's access to at least one organizational computer-based resource in response to the organizational change;
    wherein the organizational change is a restriction on access to the organizational computer-based resource, and the individual's access to the at least one organizational computer-based resource is terminated.

* * * * *